United States Patent
Nakamura (10) Patent No.: US 6,206,151 B1
(45) Date of Patent: Mar. 27, 2001

(54) VENTILATED PAD FOR A BICYCLE DISC BRAKE

(75) Inventor: Yasushi Nakamura, Itami (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/293,647

(22) Filed: Apr. 17, 1999

(51) Int. Cl.$^7$ ............................................. F16D 69/00
(52) U.S. Cl. ............................. 188/250 B; 188/250 G; 188/73.1
(58) Field of Search .................. 188/73.1, 250 B, 188/250 G, 344

(56) References Cited

U.S. PATENT DOCUMENTS

| | | | | |
|---|---|---|---|---|
| 4,036,333 | * | 7/1977 | Mathauser | 188/264 A |
| 4,537,292 | | 8/1985 | Tamura | 188/73.39 |
| 4,703,839 | * | 11/1987 | Nakano et al. | 188/344 |
| 4,732,241 | * | 3/1988 | Yoshida | 188/344 |
| 5,259,483 | | 11/1993 | Pelfrey | 188/71.1 |
| 6,068,090 | * | 5/2000 | Chen et al. | 188/250 B |

FOREIGN PATENT DOCUMENTS

| | | | | |
|---|---|---|---|---|
| 1242605 | * | 12/1959 | (FR) | 188/250 B |
| 360548 | * | 5/1931 | (GB) | 188/250 B |
| 406081864 | * | 12/1959 | (JP) | 188/250 B |
| 0157522 | * | 8/1985 | (JP) | 188/344 |
| 11218163 | * | 8/1999 | (JP) . | |

* cited by examiner

Primary Examiner—Christopher P. Schwartz
(74) Attorney, Agent, or Firm—James A. Deland (57) ABSTRACT

A brake pad for a bicycle includes a backing plate having a front surface, a rear surface, and a friction pad disposed on the front surface of the backing plate. The rear surface of the backing plate includes a groove to facilitate heat dissipation caused by friction between the friction pad and the brake disc.

29 Claims, 8 Drawing Sheets

VENTILATED PAD FOR A BICYCLE DISC BRAKE

BACKGROUND OF THE INVENTION

The present invention is directed to bicycle braking devices and, more particularly, to a ventilated brake pad for a bicycle disc brake.

Bicycling is becoming an increasingly popular form of recreation as well as a means of transportation. Moreover, bicycling has become a very popular competitive sport. Whether the bicycle is used for recreation, transportation or competition, the bicycle industry is constantly improving the bicycle components. One particular component of the bicycle, which has been extensively redesigned over the past years, is the braking system. As a result, there are several types of bicycle brake devices currently available on the market. Examples of some types of common bicycle brake devices include rim brakes, caliper brakes and disc brakes. If a rider wants a very high performance brake system, then the rider typically prefers a disc brake system wherein brake pads press against a brake disc that rotates with the bicycle wheel. Disc brake systems provide a substantial braking power in relationship to the amount of braking force applied to the brake lever. Moreover, disc brake systems typically provide a high level of consistency in all types of weather and riding conditions.

Unfortunately, one problem with disc brakes is that a tremendous amount of heat is generated by the frictional contact between the brake pads and the brake disc that is rotating very rapidly with the wheel. When the disc brake is operated by hydraulic pressure, the heat can cause the brake fluid to expand. This, in turn, causes the phenomenon known as vapor lock wherein the brake pad is pressed against the brake disc even when the brake control mechanism is released. To prevent this phenomenon, some braking systems provide an insulator between the brake pad and the piston used to press the brake pad against the brake disc. While such insulation can prevent heat transfer from the brake pad to the hydraulic components to minimize or prevent vapor lock, the inability to dissipate the heat tends to create excessive heat between the brake pad and the brake disc. This, in turn, causes the frictional contact to be less effective and risks warping the brake disc.

SUMMARY OF THE INVENTION

The present invention is directed to a ventilated disc brake pad which minimizes excessive heat build-up between the brake pad and brake disc. In one embodiment of the present invention, a brake pad for a bicycle includes a backing plate having a front surface, a rear surface, and a friction pad disposed on the front surface of the backing plate. The rear surface of the backing plate includes a groove to facilitate heat dissipation caused by friction between the friction pad and the brake disc. In a more specific embodiment, the first groove is disposed in a central portion of the backing plate, a second groove is disposed between a leading edge of the backing plate and the first groove, and a third groove is disposed between the first groove and a trailing edge of the backing plate. To further facilitate heat dissipation, a plurality of first ventilating holes are disposed in the first groove, a plurality of second ventilating holes are disposed in the second groove, and a plurality of third ventilating holes are disposed in the third groove. If desired, a first side edge of the backing plate may define a plurality of first cooling fins, and an opposite second side surface of the backing plate may define a plurality of second cooling fins. The cooling fins may be provided even without the grooves and/or ventilating holes.

DESCRIPTION OF THE DRAWINGS

FIGS. 7(A–C) are front, side and rear views of a conventional brake pad;

FIGS. 8(A–C) are front, side and rear views of a particular embodiment of a brake pad according to the present invention;

FIGS. 9(A–C) are front, side and rear views of another embodiment of a brake pad according to the present invention;

FIGS. 10(A–B) are side and rear views of the brake pad shown in FIGS. 9(A–C) showing how the caliper pistons align with the ventilating grooves;

FIGS. 11(A–C) are front, side and rear views of another embodiment of a brake pad according to the present invention;

FIGS. 12(A–C) are front, side and rear views of another embodiment of a brake pad according to the present invention; and FIGS. 13(A–C) are front, side and rear views of another embodiment of a brake pad according to the present invention.

DETAILED DESCRIPTION OF THE EMBODIMENTS

Figure 1:
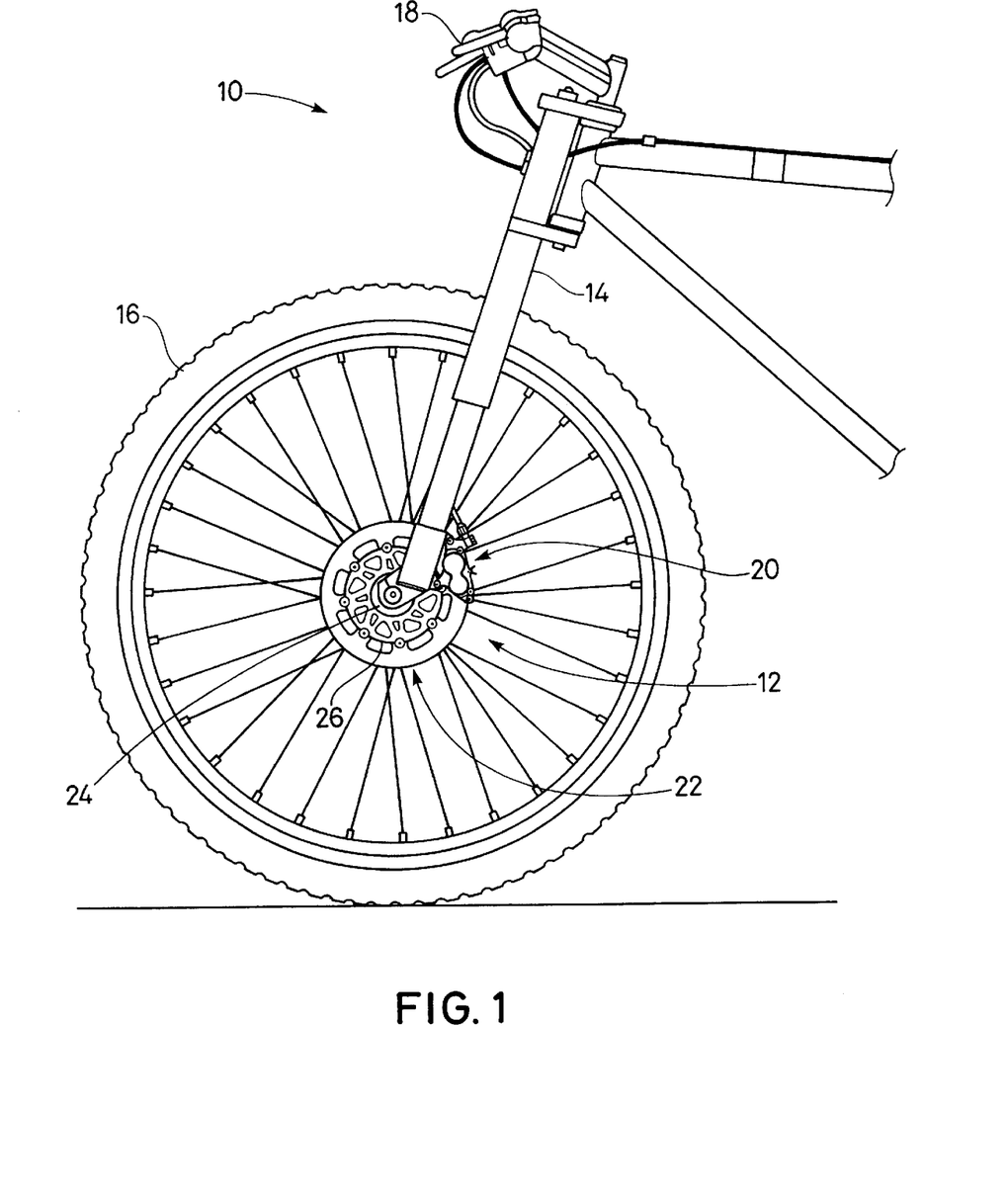
FIG. 1 is a side view of a bicycle that incorporates a particular embodiment of a disc brake apparatus according to the present invention.

FIG. 1 is a side view of a front portion of a bicycle 10 that incorporates a particular embodiment of a disc brake assembly 12 according to the present invention coupled to a front fork 14 for selectively stopping the rotation of a wheel 16. Bicycles, such as bicycle 10, are well known in the art, so bicycle 10 and its various components will not be discussed or illustrated in detail herein. Of course, bicycle 10 can be any type of bicycle, e.g., a mountain bike, a hybrid bike or a road bike. Also, while only the front portion of bicycle 10 is illustrated as having a disc brake assembly 12, it will be apparent to those skilled in the art that a second disc brake assembly 12 can be used for stopping the rear wheel of bicycle 10.

Figure 2:
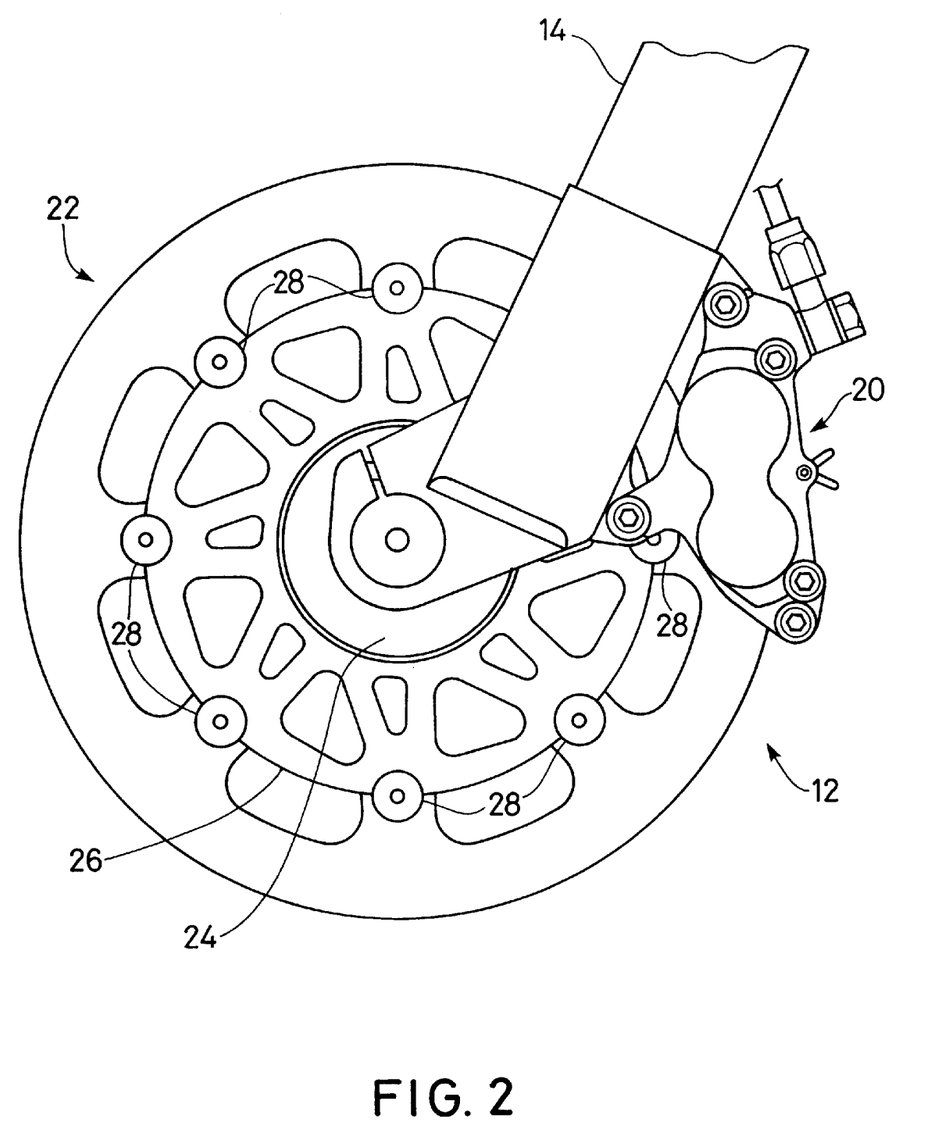
FIG. 2 is an enlarged partial side elevational view of the brake caliper and brake disc coupled to the front fork of the bicycle shown in FIG. 1.

As shown in FIGS. 1 and 2, disc brake assembly 12 includes a brake control device 18, a disc brake caliper 20 operatively coupled to brake control device 18, and a brake disc 22. Disc brake caliper 20 is fixedly coupled to fork 14 of bicycle 10, while brake disc 22 is fixedly coupled to hub 24 of wheel 16. Disc brake caliper 20 can be any type of disc brake caliper which is designed to apply a clamping force to stop rotation of the bicycle wheel 16 via brake disc 22.

Brake disc 22 is a ventilated brake disc, and it includes three components that are coupled to hub 24 of wheel 16 via a disc support member 26. More specifically, eight fasteners 28 are used to releasably couple brake disc 22 to disc support member 26. The precise connection between brake disc 22 and disc support member 26 is not critical to the present invention, Thus, the connection between brake disc 22 and disc support member 26 will not be discussed in further detail.

Figure 3:
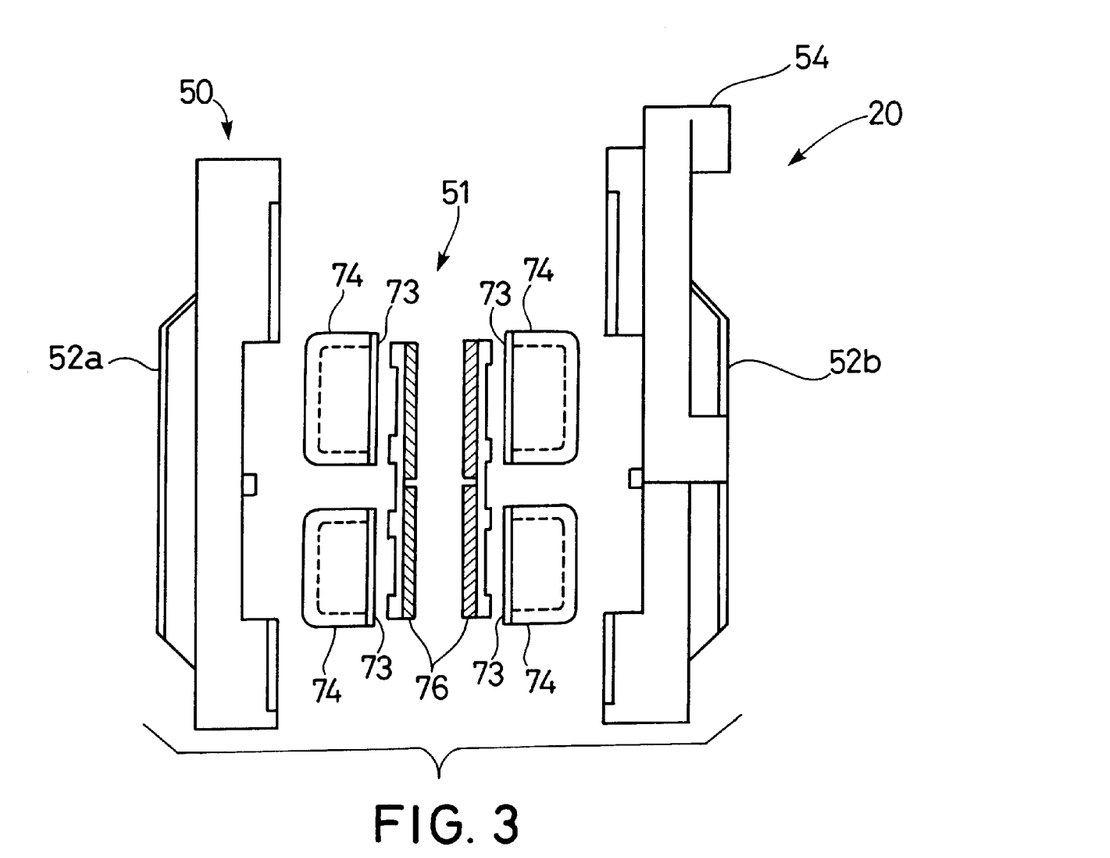
FIG. 3 is a fragmentary front view of the brake caliper, caliper pistons and brake pads used in the disc brake apparatus shown in FIG. 2.
Figures 4, 5:
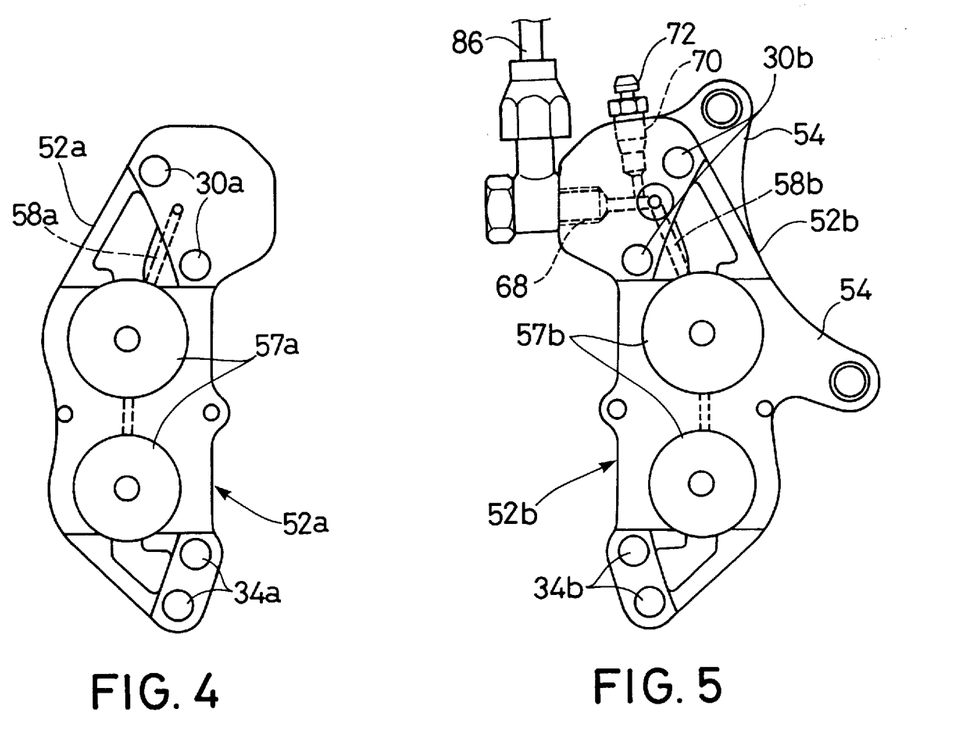
FIG. 4 is an inside side view of a particular embodiment of one side of the brake caliper shown FIG. 2.
FIG. 5 is an inside side view of a particular embodiment of the other side of the brake caliper shown in FIG. 2.

As shown in FIGS. 3–5, disc brake caliper 20 includes a housing 50 and a piston unit 51 integrally formed with housing 50. Housing 50 includes a first housing half 52a and a second housing half 52b which are bolted together in a conventional manner by passing bolts through openings 30a and 34a in first housing half 52a and through openings 30b and 34b in second housing half 52b. Also, second housing half 52b has a pair of outwardly extending flanges that form a mounting member 54 for bolting disc brake caliper 20 to fork 14 of bicycle 10. When housing halves 52a and 52b are bolted together, a disc brake slot is formed therebetween for receiving brake disc 22 therebetween.

As shown in FIGS. 4 and 5, first housing half 52a has a pair of circular piston recesses 57a and an internal fluid actuating passage 58a. Similarly, second housing half 52b has a pair of piston receiving recesses 57b and an internal fluid actuating passage 58b. *Internal fluid actuating passage 58a* extends between circular piston recesses 57a and internal fluid actuating passage 58b of second housing half 52b. In other words, the actuating fluid from brake operating mechanism 23 flows into second housing half 52b and then into internal fluid actuating passages 58a and 58b to operate piston unit 51.

Second housing half 52b has a first threaded opening 68 in fluid communication with internal fluid actuating passage 58b. Opening 68 is designed for attaching a hydraulic or actuating fluid conduit 86 thereto. A second opening 70 is also provided for threadably receiving a bleed nipple 72. Opening 70 is in fluid communication with internal fluid actuating passage 58b so that air can be removed from the actuating system. Internal fluid actuating passage 58b interconnects piston recesses 57b together for receiving actuating fluid or hydraulic fluid to activate piston unit 51.

As shown in FIG. 3, piston unit 51 preferably includes four pistons 74 with insulators 73 for pressing against a pair of brake pads 76. Pistons 74 are slidably received in piston recesses 57a and 57b for movement between a release position and a braking position. Brake pads 76 are located on the free ends of pistons 74 for movement therewith. In other words, as pistons 74 move from a release position to a braking position, brake pads 76 also move from a release position to a braking position. In the braking position, brake pads 76 frictionally engage brake disc 22 to stop the rotation of brake disc 22 and wheel 16. In the release position, brake pads 76 are spaced from brake disc 22 to allow brake disc 22 and wheel 16 to freely rotate therebetween. Pistons 74 and brake pads 76 are moved from their release positions to their braking positions by actuating or hydraulic fluid applying a force to pistons 74. More specifically, as brake operating mechanism 23 is actuated, actuating fluid is pressurized so as to force pistons 74 and brake pads 76 toward brake disc 22.

Figure 6:
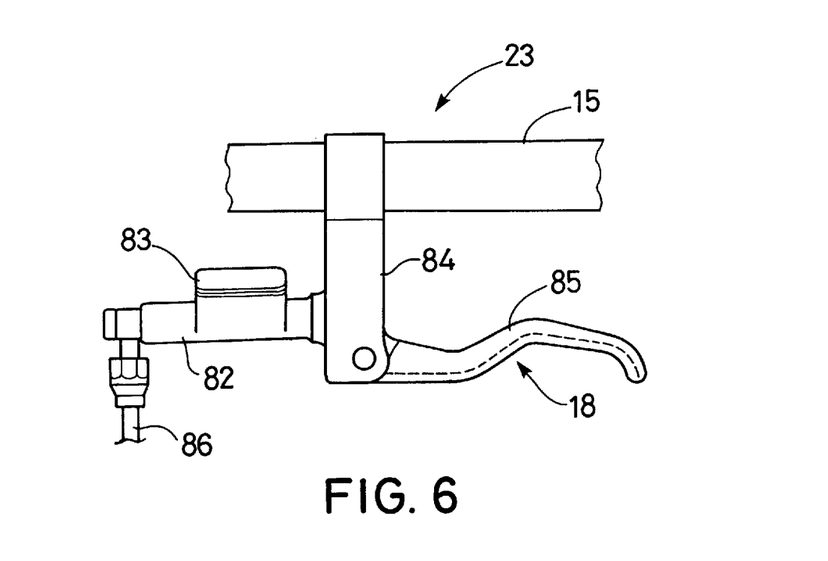
FIG. 6 is a top view of a particular embodiment of the brake control device shown in FIG. 1.

Brake control device 18 is designed to actuate pistons 74 in disc brake caliper 20 to apply a forcible gripping action on brake disc 22 to stop rotation of front wheel 16. As shown in FIG. 6, brake control device 18 includes a brake lever 85, a hydraulic or master cylinder 82 containing a conventional hydraulic or master piston (not shown), and an actuation fluid reservoir 83. Preferably, brake control device 18 is a single unit which is mounted on handlebar 15. In particular, brake control device 18 includes a mounting portion 84 and a brake lever 85. Mounting portion 84 is designed to be clamped onto handle bar 15 in a conventional manner. Mounting portion 84 is integrally formed with master cylinder 82 such that master cylinder 82 and actuation fluid reservoir 83 are all supported on mounting portion 84 of brake lever 85. Brake lever 85 is pivotally coupled to mounting portion 84 for movement between a release position and a braking position. Normally, brake lever 85 is biased toward and located in a release position in a conventional manner.

As known in the art, actuation fluid reservoir 83 is mounted on master cylinder 82 and is in fluid communication with an interior bore of master cylinder 82 (not shown) for supplying actuation fluid thereto. The master piston (not shown) is connected at one end to brake lever 85 for axially moving the master piston within master cylinder 82 in response to pivoting of brake lever 85. This movement of the master piston within master cylinder 82 directs fluid pressure through hydraulic or actuating fluid conduit 86 which is coupled to disc brake caliper 20. Thus, the pressurized actuation fluid causes the pistons 74 and brake pads 76 to move so as to engage brake disc 22 to stop rotation of wheel 16.

Figure 7A:
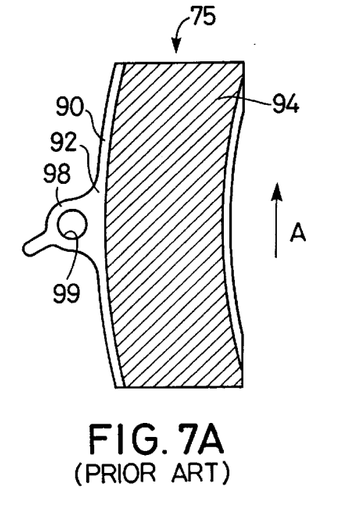
Figure 7B:
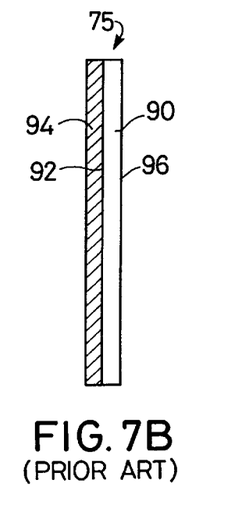
Figure 7C:
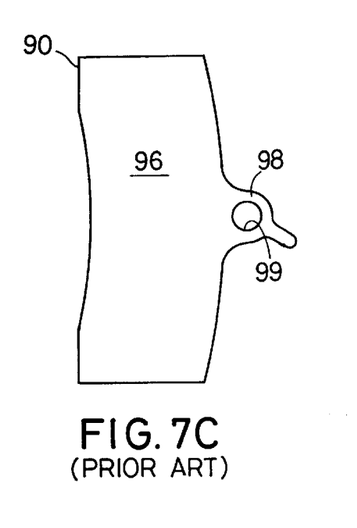

FIGS. 7(A–C) are front, side and rear views illustrating a conventional brake pad 75 which in the past was used to engage brake disc 22 to stop rotation of wheel 16. Brake pad 75 included a metal backing plate 90 and a friction pad 94 disposed on a front surface 92 of backing plate 90. Metal backing plate 90 typically has a uniformly flat rear surface 96 and a guide ear 98 with a guide opening 99 for receiving a guide pin (not shown) therethrough. Backing plate 90 and friction pad 94 are elongated in a direction of rotation of brake disc 22 illustrated by arrow A.

Figure 8A:
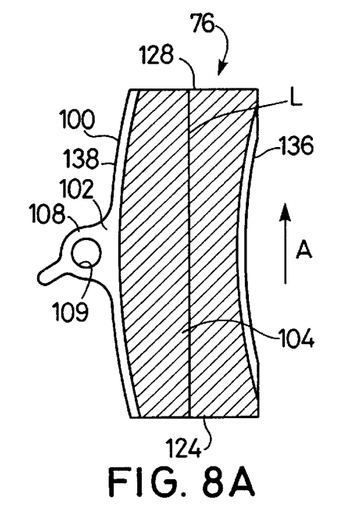
Figure 8B:
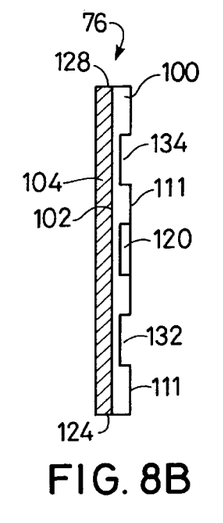
Figure 8C:
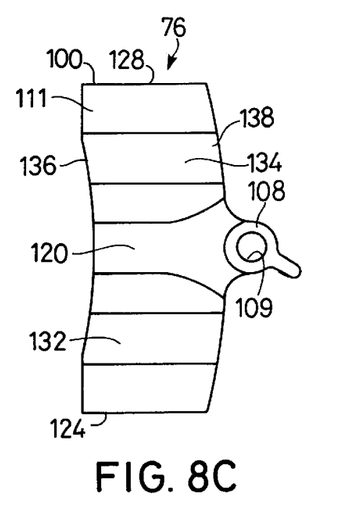

FIGS. 8(A–C) are front, side and rear views, respectively, illustrating a particular embodiment of a brake pad 76 according to the present invention. As with brake pad 75, brake pad 76 includes a metal backing plate 100 and a friction pad 104 disposed on a front surface 102 of backing plate 100, wherein backing plate 100 and friction pad 104 are elongated in the direction of rotation of brake disc 22 illustrated by arrow A. Metal backing plate 100 also has a guide ear 108 with a guide opening 109 for receiving a guide pin (not shown) therethrough. However, unlike the conventional brake pad 75, brake pad 76 according to the present invention does not have a uniformly flat rear surface. Instead, a rear surface 111 of backing plate 100 has a hollow central groove 120 disposed approximately midway between a leading edge 124 and a trailing edge 128 of backing plate 100, a hollow first offset groove 132 located approximately midway between leading edge 124 and central groove 120, and a hollow second offset groove 134 located approximately midway between central groove 120 and trailing edge 128. In this embodiment, central groove 120, first offset groove 132 and second offset groove 134 extend substantially perpendicular to a longitudinal axis L of brake pad 76 which is parallel to the rotation direction A and extend all the way from a first side edge 136 of backing plate 100 to a second side edge 138 of backing plate 100.

Figure 9A:
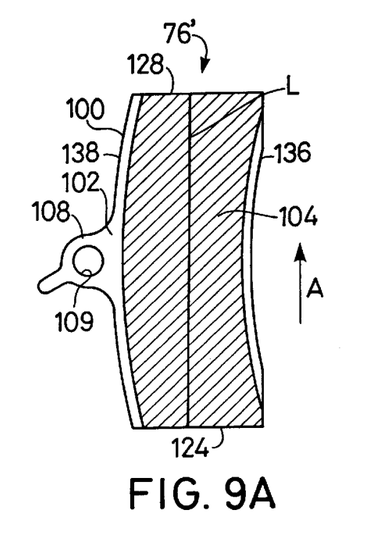
Figures 9B, 9C:
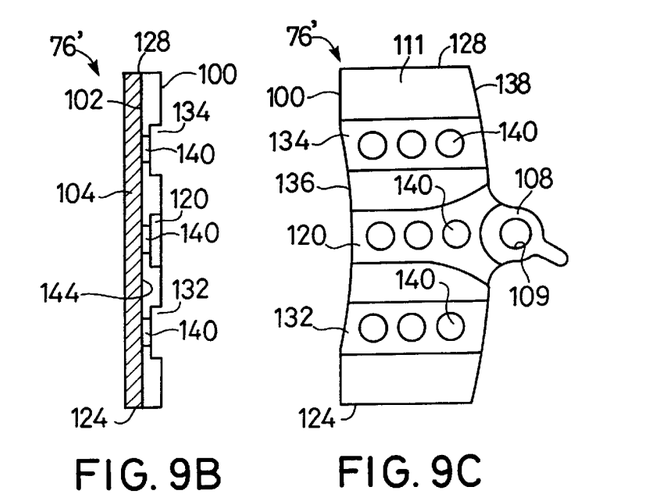

FIGS. 9(A–C) are front, side and rear views, respectively, illustrating a brake pad 76' in an alternative embodiment of the present invention. Brake pad 76' is very similar to brake pad 76 shown in FIGS. 8(A–C), so the structures that are the same as brake pad 76 are numbered the same. Brake pad 76' differs from brake pad 76 in that a plurality of ventilating holes 140 that extend to an inner surface 144 of friction pad 104 are disposed in each of central groove 120, first offset groove 132 and second offset groove 134. Ventilating holes 140 further assist the cooling of the brake pad.

Figure 10A:
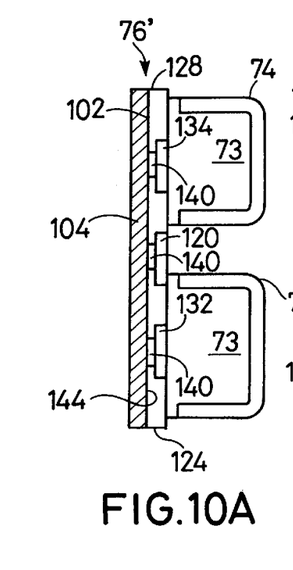
Figure 10B:
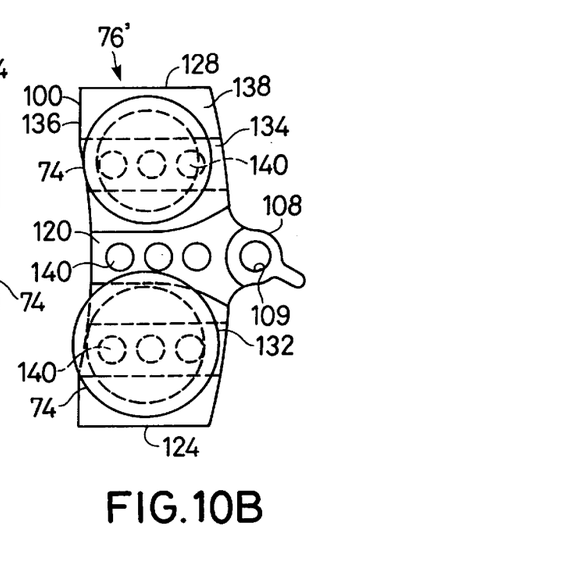

FIGS. 10(A–B) are side and rear views, respectively of brake pad 76' showing how the caliper pistons 74 align with first offset groove 132 and second offset groove 134. First offset groove 132 and second offset groove 134 pass under central portions of pistons 74 to form ventilating passages and so that they do not interfere with the pressing operation of pistons 74.

Figure 11A:
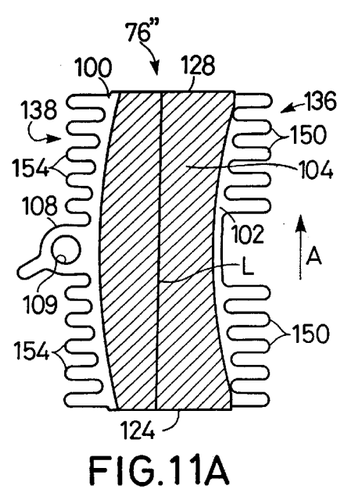
Figure 11B:
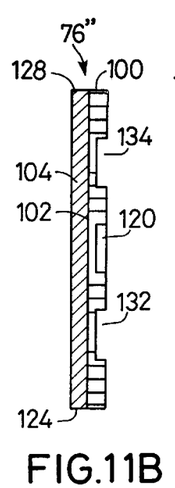
Figure 11C:
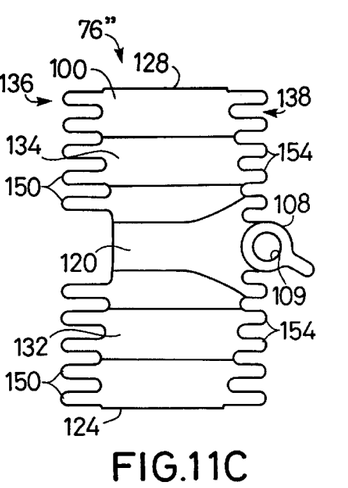

FIGS. 11(A–C) are front, side and rear views, respectively, illustrating a brake pad 76" in another alternative embodiment of the present invention. Brake pad 76" is similar to brake pad 76 shown in FIGS. 8(A–C), so the structures that are the same as brake pad 76 are numbered the same. Brake pad 76" differs from brake pad 76 in that side 136 defines a plurality of cooling fins 150, and side 138 defines a plurality of cooling fins 154. Cooling fins 150 and 154 further assist the cooling function.

Figure 12A:
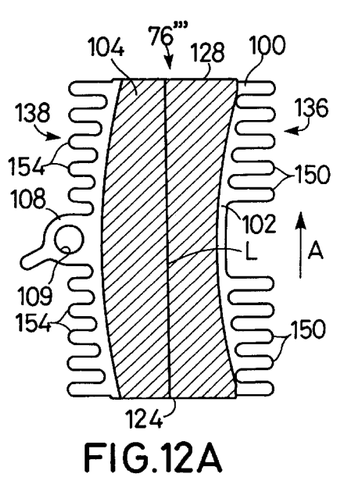
Figure 12B:
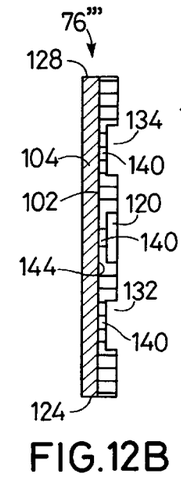
Figure 12C:
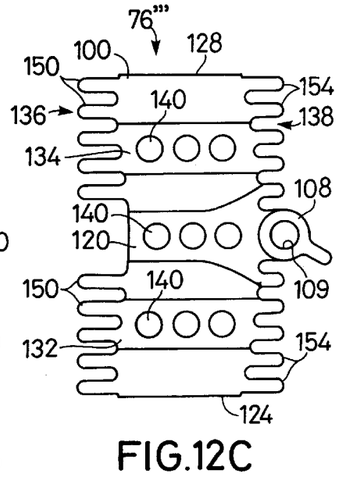

FIGS. 12(A–C) are front, side and rear views, respectively, illustrating a brake pad 76'" in another alternative embodiment of the present invention. Brake pad 76'" is similar to brake pad 76" shown in FIGS. 11(A–C), so the structures that are the same as brake pad 76" are numbered the same. Brake pad 76'" differs from brake pad 76" in that, like brake pad 76' shown in FIGS. 9(A–C), a plurality of ventilating holes 140 that extend to an inner surface 144 of friction pad 104 are disposed in each of central groove 120, first offset groove 132 and second offset groove 134.

Figure 13A:
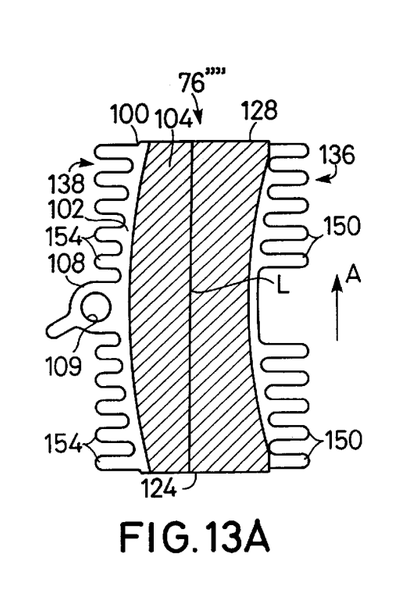
Figure 13B:
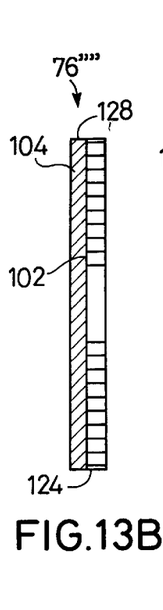
Figure 13C:
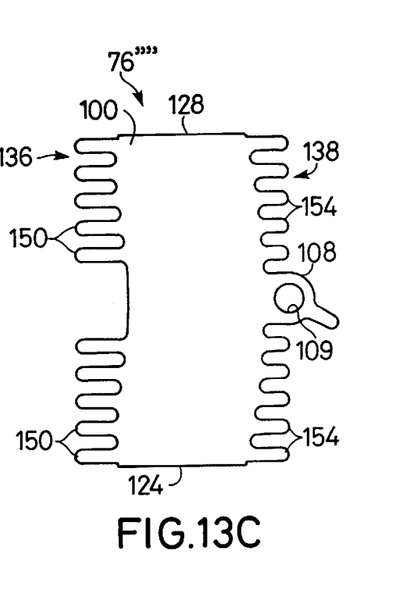

FIGS. 13(A–C) are front, side and rear views, respectively, illustrating a brake pad 76"" in another alternative embodiment of the present invention. Brake pad 76"" includes cooling fins 150 and 154, but in this embodiment central groove 120, first offset groove 132 and second offset groove 134 are omitted.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A brake pad for a bicycle comprising:
   a backing plate having a front surface, a rear surface, a leading edge, a trailing edge, a first side edge, and a second side edge;
   wherein a distance between the leading edge and the trailing edge is greater than a distance between the first side edge and the second side edge;
   a friction pad disposed on the front surface of the backing plate;
   wherein the rear surface of the backing plate includes a first groove that extends only partially through the backing plate; and
   wherein the first groove is disposed substantially equidistant of the leading edge and the trailing edge of the backing plate and extends in a direction from the first side edge toward the second side edge of the backing plate.

2. The brake pad according to claim 1 wherein the backing plate further includes a ventilating hole disposed in the first groove.

3. The brake pad according to claim 2 wherein the ventilating hole extends to a surface of the friction pad.

4. The brake pad according to claim 3 wherein the backing plate includes a plurality of the ventilating holes disposed in the first groove.

5. The brake pad according to claim 2 wherein the ventilating hole extends only partially through the backing plate.

6. The brake pad according to claim 1 wherein the first groove extends substantially perpendicular to a longitudinal axis of the brake pad that extends from the leading edge of the backing plate to the trailing edge of the backing plate.

7. The brake pad according to claim 6 wherein the first groove extends completely from the first side edge of the backing plate to the second side edge of the backing plate.

8. The brake pad according to claim 2 wherein the first side edge of the backing plate defines a plurality of first cooling fins.

9. The brake pad according to claim 8 wherein the second side edge of the backing plate defines a plurality of second cooling fins.

10. A brake pad for a bicycle comprising:
    a backing plate having a front surface, a rear surface, a leading edge, a trailing edge, a first side edge, and a second side edge;
    a friction pad disposed on the front surface of the backing plate;
    wherein the rear surface of the backing plate includes a first groove;
    wherein the first groove is disposed between a central portion of the backing plate and one of either the leading edge of the backing plate or the trailing edge of the backing plate; and
    wherein the backing plate further includes a ventilating hole disposed in the first groove and extending only partially through the backing plate.

11. The brake pad according to claim 13 wherein the backing plate includes a plurality of the ventilating holes disposed in the first groove.

12. A brake pad for a bicycle comprising:
    a backing plate having a front surface, a rear surface, a leading edge, a trailing edge, a first side edge, and a second side edge;
    wherein a distance between the leading edge and the trailing edge is greater than a distance between the first side edge and the second side edge;
    a friction pad disposed on the front surface of the backing plate;
    wherein the rear surface of the backing plate includes a first groove;
    wherein the first groove is disposed between a central portion of the backing plate and one of either the leading edge of the backing plate or a trailing edge of the backing plate and extends in a direction from the first side edge of the backing plate toward the second side edge of the backing plate; and
    wherein the first side edge of the backing plate defines a plurality of cooling fins.

13. The brake pad according to claim 11 wherein at least one of the front surface of the rear surface is substantially flat.

14. The brake pad according to claim 13 wherein the plurality of cooling fins extend substantially parallel to the at least one of the front surface or the rear surface that is substantially flat.

15. A brake pad for a bicycle comprising:
a backing plate having a front surface and a rear surface;
a friction pad disposed on the front surface of the backing plate;
wherein the rear surface of the backing plate includes:
a first groove disposed in a central portion of the backing plate;
a second groove disposed between a leading edge of the backing plate and the first groove; and
a third groove disposed between the first groove and a trailing edge of the backing plate; and
wherein the first groove, the second groove and the third groove each extend substantially perpendicular to a longitudinal axis of the brake pad.

16. The brake pad according to claim 15 wherein the first groove, the second groove and the third groove each extend completely from a first side edge of the backing plate to a second side edge of the backing plate.

17. A brake pad for a bicycle comprising:
a backing plate having a front surface and a rear surface;
a friction pad disposed on the front surface of the backing plate;
wherein the rear surface of the backing plate includes:
a first groove disposed in a central portion of the backing plate;
a second groove disposed between a leading edge of the backing plate and the first groove; and
a third groove disposed between the first groove and a trailing edge of the backing plate; and
wherein the backing plate further includes:
a first ventilating hole disposed in the first groove;
a second ventilating hole disposed in the second groove; and
a third ventilating hole disposed in the third groove.

18. The brake pad according to claim 17 wherein the first ventilating hole, the second ventilating hole and the third ventilating hole each extend to a surface of the friction pad.

19. The brake pad according to claim 18 wherein the backing plate includes:
a plurality of the first ventilating holes disposed in the first groove;
a plurality of the second ventilating holes disposed in the second groove; and
a plurality of the third ventilating holes disposed in the third groove.

20. A brake pad for a bicycle comprising:
a backing plate having a front surface, a rear surface, a leading edge, a trailing edge, a first side edge and a second side edge;
wherein a distance between the leading edge and the trailing edge is greater than a distance between the first side edge and the second side edge;
a friction pad disposed on the front surface of the backing plate;
wherein the rear surface of the backing plate includes a groove;
wherein the groove is disposed in a central portion of the backing plate and extends in a direction from the first side edge of the backing plate toward the second side edge of the backing plate; and
a plurality of cooling fins extending from at least one of the first side edge or the second side edge.

21. The brake pad according to claim 20 wherein at least one of the front surface of the backing plate or the rear surface of the backing plate is substantially flat.

22. The brake pad according to claim 21 wherein the plurality of cooling fins extend substantially parallel to the at least one of the front surface of the backing plate or the rear surface of the backing plate that is substantially flat.

23. A brake pad for a bicycle comprising:
a backing plate having a front surface and a rear surface;
a friction pad disposed on the front surface of the backing plate;
wherein the rear surface of the backing plate includes a first groove;
wherein the first groove is disposed between a central portion of the backing plate and one of either a leading edge of the backing plate and a trailing edge of the backing plate;
wherein a first side edge of the backing plate defines a plurality of first cooling fins; and
wherein an opposite second side edge of the backing plate defines a plurality of second cooling fins.

24. A brake pad for a bicycle comprising:
a backing plate having a front surface, a rear surface, a leading edge, a trailing edge, a first side edge, and a second side edge;
wherein a distance between the leading edge and the trailing edge is greater than a distance between the first side edge and the second side edge;
a friction pad disposed on the front surface of the backing plate;
wherein the rear surface of the backing plate includes;
a first groove disposed in a central portion of the backing plate;
a second groove disposed between a leading edge of the backing plate and the first groove;
a third groove disposed between the first groove and a trailing edge of the backing plate;
wherein each of the first groove, the second groove and the third groove extends in a direction from the first side edge of the backing plate toward the second side edge of the backing plate; and
wherein the first side edge of the backing plate defines a plurality of first cooling fins.

25. A brake pad for a bicycle comprising:
a backing plate having a front surface and a rear surface;
a friction pad disposed on the front surface of the backing plate;
wherein the rear surface of the backing plate includes:
a first groove disposed in a central portion of the backing plate;
a second groove disposed between a leading edge of the backing plate and the first groove; and
a third groove disposed between the first groove and a trailing edge of the backing plate;
wherein a first side edge of the backing plate defines a plurality of first cooling fins; and
wherein an opposite second side edge of the backing plate defines a plurality of second cooling fins.

26. A brake pad for a bicycle comprising:
a substantially flat backing plate having a front surface; a rear surface; a leading edge; a trailing edge; a first side edge; and a second side edge;

wherein a distance between the leading edge and the trailing edge is greater than a distance between the first side edge and the second side edge;

a friction pad disposed on the front surface of the backing plate; and wherein the first side edge of the backing plate defines a plurality of cooling fins extending in a direction from the first side edge toward the second side edge.

27. A brake pad for a bicycle comprising:

a backing plate having a front surface and a rear surface;

a friction pad disposed on the front surface of the backing plate;

wherein a first side edge of the backing plate defines a plurality of first cooling fins; and wherein an opposite second side edge of the backing plate defines a plurality of second cooling fins.

28. A brake pad for a bicycle comprising:

a backing plate having a front surface and a rear surface;

a friction pad disposed on the front surface of the backing plate;

wherein the rear surface of the backing plate includes a groove;

wherein the groove is disposed in a central portion of the backing plate; and wherein the backing plate further includes a ventilating hole disposed in the groove, wherein the ventilating hole extends only partially through the backing plate.

29. A brake pad for a bicycle comprising:

a backing plate having a front surface and a rear surface;

a friction pad disposed on the front surface of the backing plate;

wherein the rear surface of the backing plate includes a groove;

wherein the groove is disposed in a central portion of the backing plate;

wherein a first side edge of the backing plate defines a plurality of first cooling fins; and wherein an opposite second side edge of the backing plate defines a plurality of second cooling fins.

* * * * *